United States Patent [19]

Vondra

[11] Patent Number: 4,606,712

[45] Date of Patent: Aug. 19, 1986

[54] SELF-PUMPING PUMP SHAFT SEAL

[75] Inventor: Lubomir Vondra, Kansasville, Wis.

[73] Assignee: Abex Corporation, Stamford, Conn.

[21] Appl. No.: 671,346

[22] Filed: Nov. 14, 1984

[51] Int. Cl.[4] .................. F04C 2/18; F04C 15/00; F16J 15/34; F16J 15/54

[52] U.S. Cl. .................. 418/88; 418/104; 418/206; 415/170 B; 277/96.1; 277/133

[58] Field of Search .................. 418/104, 88, 206; 277/96 R, 96.1, 133; 415/112, 170 B

[56] References Cited

U.S. PATENT DOCUMENTS

| | | | |
|---|---|---|---|
| 1,699,385 | 1/1929 | Whittingham | 277/133 |
| 2,108,701 | 2/1938 | Amberg | 277/133 |
| 2,672,823 | 3/1954 | Thomson et al. | 418/206 |
| 2,768,011 | 10/1956 | Mosher . | |
| 3,031,198 | 4/1962 | Hudson | 277/96.1 |
| 3,746,350 | 7/1973 | Mayer et al. . | |
| 3,799,713 | 3/1974 | Cloots et al. | 418/206 |
| 3,843,140 | 10/1974 | Mayer et al. . | |
| 4,026,564 | 5/1977 | Metcalfe . | |
| 4,095,806 | 6/1978 | Dempsey | 277/96 |
| 4,128,362 | 12/1978 | Shepherd et al. | 415/112 |
| 4,323,255 | 4/1982 | Wiese . | |

FOREIGN PATENT DOCUMENTS 3135037 9/1982 Fed. Rep. of Germany ...... 418/104

*Primary Examiner*—John J. Vrablik
*Attorney, Agent, or Firm*—Mueller and Smith

[57] ABSTRACT

A positive displacement pump is provided with an impeller drive shaft seal assembly to prevent material in the pumping chamber from reaching an adjacent drive shaft chamber. The seal assembly comprises a rotary seal member mounted on the impeller having an outer surface spaced a non-uniform distance from the inner surface of a member defining the drive shaft chamber so that when the drive shaft is rotated the changing distance between the inner and outer surfaces causes a pumping action to occur so that material is continually pumped around the seal assembly.

1 Claim, 3 Drawing Figures

SELF-PUMPING PUMP SHAFT SEAL

BACKGROUND OF THE INVENTION

This invention relates generally to positive-displacement pumps and, more particularly, to impeller shaft seals for such pumps.

Low pressure positive-displacement pumps often are used as sanitary pumps to pump fluid food products, such as catsup, mayonnaise, relish, soup and the like. In these applications, it is essential to continually move the fluid food products through the pump so that none of the products can collect within the pump and stagnate. Should stagnation occur, entire batches of food product could spoil, resulting in economic loss.

One type of pump often used in such sanitary applications is a dual-chamber, dual-lobe pump. Each lobe, or impeller, is driven by a drive shaft, which is sealed from the pump chamber by a two-part seal, comprising a rotary seal member mounted on the impeller, a stationary seal member surrounding the drive shaft, and a spring biasing the stationary seal member into engagement with the rotating seal member. Both of these seal members are conventionally circular and concentric with the drive shaft axis. These seal members and the housing define a confined peripheral pocket. Turbulence of the fluid product prevents it from collecting and stagnating in this pocket. Turbulence of a pumped fluid can be caused by cavitation, which is the result of supplying less fluid to the pumping chamber than the chamber can hold. However, cavitation results in reduced efficiency and ultimate pump damage due to resulting turbulence which causes severe fluid expansion impact to the surface of the pump parts. To counteract turbulence, pump manufacturers, such as applicant's assignee, have developed improved pump designs such as disclosed in U.S. Pat. No. 3,799,713—Cloots et al. However, reduced turbulence increases the aforementioned pumped fluid food product stagnation problem.

It is, therefore, an object of this invention to provide an improved shaft seal which reduces, or eliminates, the problem of collection and stagnation of pumped fluid food product in a sanitary pump in which turbulence is reduced or eliminated. It is a further object to provide a shaft seal which has reduced wear.

SUMMARY OF THE INVENTION

The instant invention includes a pump shaft seal having an impeller-mounted seal member that has a non-concentric configuration and coacts with a stationary seal member surrounding the drive shaft to provide a pumping action that continually pumps product into and out of a confined annular pocket defined by the seal members and the pump housing.

DETAILED DESCRIPTION OF THE INVENTION

Figure 1:
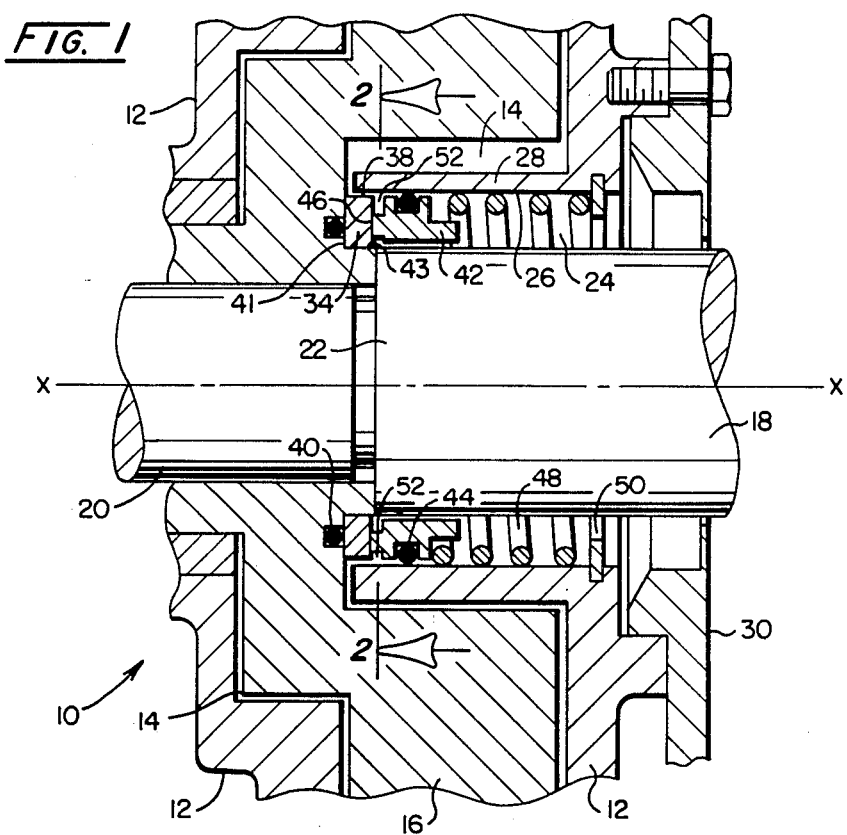
FIG. 1 is a fragmentary sectional view of a positive displacement pump incorporating a shaft seal arrangment according to the instant invention.
Figure 3:
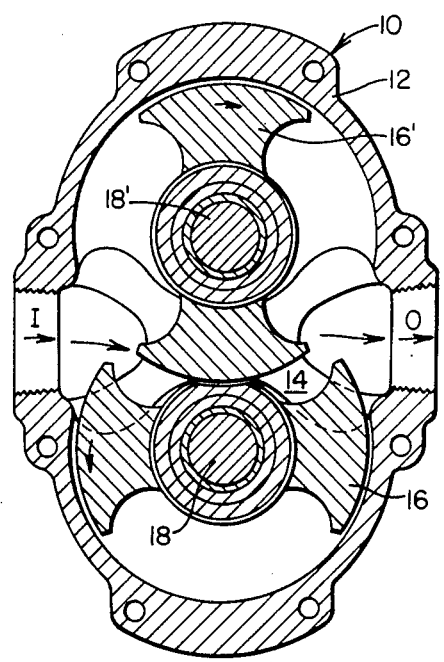
FIG. 3 is a traverse sectional view of a positive displacement pump which incorporates the shaft seal arrangement of the invention.

FIGS. 1 and 3 show a portion of a dual-lobe positive displacement pump 10 of the type shown in U.S. Pat. No. 3,799,713—Cloots, et al. Pump 10 includes a stationary housing 12 which defines a pump chamber 14 that receives a pair of impellers 16, 16' rigidly mounted on drive shafts 18, 18' which are journaled by means not shown, in housing 12. Although the seal of this invention is utilized on both drive shafts 18, 18', the seal will be described only in conjunction with drive shaft 18 since the seal components and the seal function are identical for shaft 18'. Shaft 18 is rotated about its axis X—X by a motor (not shown) to enable impeller 16 to rotate and pump fluid from an inlet (I) to an outlet (O).

Drive shaft 18 includes a main portion 20 that mounts impeller 16 and an enlarged end portion 22 that extends through a drive shaft chamber 24 defined in part by an inner annular surface 26 of a housing hub 28. Surface 26 is concentric with drive shaft axis X—X. The outer end of chamber 24 is closed by a cover plate 30 that is bolted to housing 12. As can be seen in FIG. 1, the inner end of chamber 24 is isolated from pump chamber 14 by a seal arrangement which will now be described.

The seal arrangement includes an annular rotary seal member 34 and an annular stationary seal member 42. The rotary seal member 34 (preferably of a ceramic material) is mounted on impeller 16 and secured thereto by mating flats 36 (see FIG. 2) to assure rotation therewith. The outer surface 38 of member 34 is preferably circular, is located eccentrically with respect to axis X—X, and rotates within drive shaft chamber 24. An O-ring 40 is provided to seal the interface between impeller 16 and the rear face 41 of seal member 34.

Figure 2:
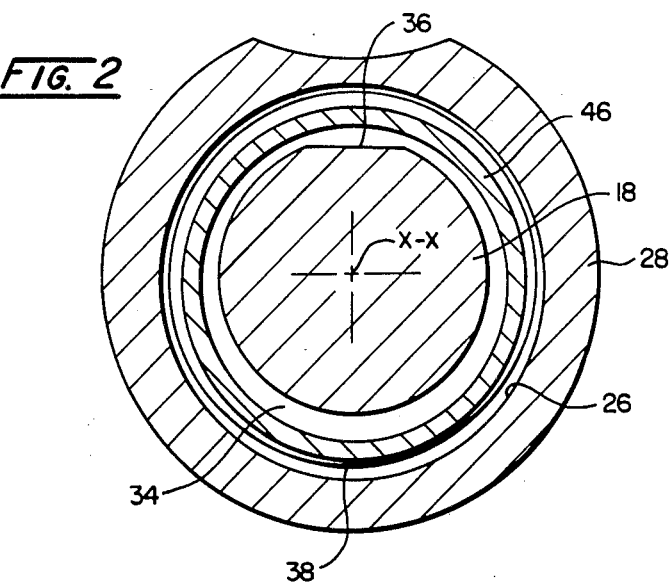
FIG. 2 is a sectional view taken along lines 2—2 of FIG. 1.

Annular stationary seal member 42 (preferably of a carbon material) is located within chamber 24 and surrounds drive shaft portion 22. An outer O-ring 44 is provided as a seal between surface 26 and seal member 42. An annular face seal seat 46 is provided on seal member 42 to contact the front face 43 of rotary seal member 34. As shown in FIG. 2, seal seat 46 is circular, and is mounted eccentrically with respect to axis X—X. Seal seat 46 is biased into contact with seal member 34 by a coil spring 48 that surrounds drive shaft portion 22 and is retained within drive shaft chamber 24 by a snap ring 50.

Since there must be radial clearance between the outer surface 38 of rotary seal member 34 and the inner surface 26 of stationary hub 28, pumped fluid product in chamber 14 has access to a peripheral pocket 52 defined by seal members 34 and 42 and inner surface 26. In conventional pumps where concentric rotary and stationary seals are used, it is possible that pumped fluid food product can be trapped in this pocket.

Applicant's invention eliminates or reduces this possibility by the aforementioned non-concentric seal members 34, 42. Because outer surface 38 of rotary seal member 34 is eccentric with respect to rotational axis X—X, the distance between surface 38 and the inner surface 26 of hub 28 will continually change. This changing distance will cause material to be continually pumped into and out of peripheral pocket 52. This pumping of product significantly reduces the possibility that product will remain trapped in pocket 52. In other words, seal member 34 acts as a single lobe pump. Of course, other configurations of seal member 34 would also work. For example, seal member 34 could be mounted concentric with the axis X—X of shaft 18 and have a non-circular outer surface 38 which would also cause the distance between outer surface 38 and inner surface 26 of hub 28 to change as shaft 18 is rotated.

Since certain changes may be made in the above-described system, method and apparatus without departing from the scope of the invention herein, it is intended that all matter contained in the description thereof or shown in the accompanying drawings shall be interpreted as illustrative and not in a limiting sense.

I claim:

1. A positive displacement fluid pump having a stationary housing, a pump chamber in the housing having an inlet and an outlet; a drive shaft rotatably mounted in the housing; a rotary impeller located in the pump chamber and mounted on the drive shaft to pump fluid from the inlet to the outlet; an annular drive shaft chamber opening into the pump chamber in the housing through which the drive shaft extends and having an inner surface concentric with the drive shaft axis; and sealing means for sealing the drive shaft chamber from the pump chamber comprising a rotary seal member mounted for rotation with the impeller, a stationary seal member mounted on the drive shaft chamber inner surface surrounding the drive shaft, and means biasing the seal members into contact; an outer surface on the rotary seal member which opposes the drive shaft chamber inner surface, a peripheral pocket being defined by the drive shaft chamber inner surface, the stationary seal member, and the rotary seal member, the peripheral pocket being in communication with the pump chamber; charactertized by the rotary seal member having its outer end surface spaced a non-uniform radial distance from the adjacent inner surface of the drive shaft chamber so that when the drive shaft is rotated the changing radial distance between the inner and outer surfaces causes a continuous pumping of material into and out of the peripheral pocket.

* * * * *